United States Patent [19]
van den Nieuwelaar et al.

[11] Patent Number: 5,135,431
[45] Date of Patent: Aug. 4, 1992

[54] DEVICE AND METHOD FOR REMOVING ABDOMINAL FAT FROM A SLAUGHTERED BIRD

[75] Inventors: Adrianus J. van den Nieuwelaar, Gemert; George F. H. Fick, Sint Antonis, both of Netherlands

[73] Assignee: Stork PMT B.V., AV Boxmeer, Netherlands

[21] Appl. No.: 789,745

[22] Filed: Nov. 8, 1991

[30] Foreign Application Priority Data

Nov. 12, 1990 [NL] Netherlands .......................... 9002471

[51] Int. Cl.⁵ .............................................. A22C 21/00
[52] U.S. Cl. .................................... 452/116; 452/117; 452/118
[58] Field of Search ............... 452/106, 116, 117, 118, 452/109

[56] References Cited

U.S. PATENT DOCUMENTS

| | | | |
|---|---|---|---|
| 2,943,346 | 7/1960 | Jensen | 452/116 |
| 3,137,031 | 6/1964 | Ine | 452/116 |
| 3,802,028 | 4/1974 | Scheier et al. | 452/116 |
| 4,004,320 | 1/1977 | Scheier | 452/116 |
| 4,023,237 | 5/1977 | Meyn | 452/122 |
| 4,024,603 | 5/1977 | Harben, Jr. et al. | 452/116 |
| 4,270,242 | 6/1981 | Loth et al. | 452/116 |
| 4,564,977 | 1/1986 | Scheier et al. | 452/109 |
| 4,739,539 | 4/1988 | Simmons | 452/106 |
| 4,876,767 | 10/1989 | Harben, III et al. | 456/106 |
| 4,899,421 | 2/1990 | van der Eerden | 452/116 |
| 4,924,551 | 5/1990 | Greenbank et al. | 452/106 |

FOREIGN PATENT DOCUMENTS

| | | |
|---|---|---|
| 258499 | 3/1988 | European Pat. Off. . |
| 258939 | 3/1988 | European Pat. Off. . |
| 2147190 | 5/1985 | United Kingdom . |

*Primary Examiner*—Willis Little
*Attorney, Agent, or Firm*—Hurt, Richardson, Garner, Todd & Cadenhead

[57] ABSTRACT

A device for removing abdominal fat from a slaughtered bird, comprising a scraper element which is movable through an abdominal opening between the legs, and a device for discharging the fat scraped off by the scraper element, further comprising an elongated hollow mandrel, which can be connected to a vacuum source. The mandrel at the end facing the bird is provided with a suction aperture, at a distance from which the scraper element is fitted, said scraper element being provided with a scraping edge for interacting with the complementary-shaped edge of a supporting element, for scraping the abdominal fat along the scraping edge during a movement of the scraper element interacting with the supporting element away from the bird. An installation may comprise a number of such devices. In a method for operating the device the scraper element is inserted into the belly cavity of the bird; the skin with the abdominal fat is sucked into the mandrel; the supporting element is moved to the scraping edge, leaving a narrow gap; and the scraper element and the supporting element are moved away from the bird.

11 Claims, 4 Drawing Sheets

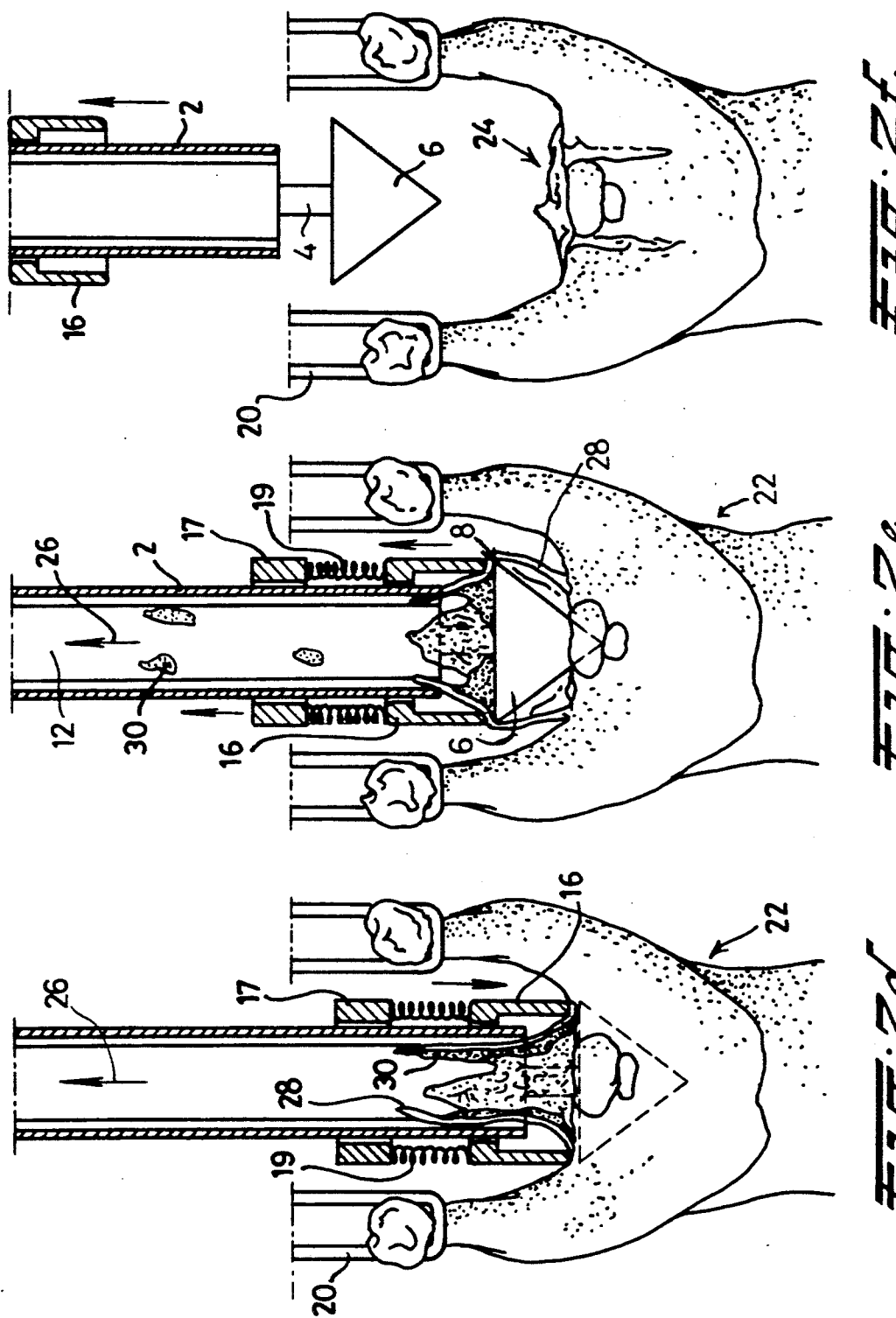

DEVICE AND METHOD FOR REMOVING ABDOMINAL FAT FROM A SLAUGHTERED BIRD

BACKGROUND OF THE INVENTION

The invention relates to a device for removing abdominal fat from a slaughtered bird, comprising a scraper element which is movable to and partially into the bird through an abdominal opening between the legs, and which has a scraping edge which is movable along the fat on the inside of the skin around the abdominal opening, and a discharge device for discharging the fat scraped off by the scraper element. The invention also relates to an installation which comprises a number of such devices, and to a method for operating the device.

DISCUSSION OF THE PRIOR ART

A device for removing abdominal fat from a slaughtered bird is known from European Patent Application No. 0,258,499. In it the scraper element is formed by an elongated screw spindle which is rotatable about its longitudinal axis and is fitted with a radial clearance in a cylindrical bush and projects partially therefrom. For the removal of the abdominal fat from a slaughtered bird, the part of the screw spindle projecting from the bush is passed through an opening between the legs of the bird into the belly cavity of the bird. During the processing, the screw spindle is rotated in such a way that the rib of the screw spindle moves towards and into the bush, viewed in the axial direction. The skin present around the opening, on the inside of which the fat to be gained is situated, is carried along by the screw spindle rib towards and into the bush, the skin coming to rest against the inside wall of the bush, which is possible thanks to the clearance with the width of the skin thickness between the periphery of the screw spindle rib and the inside wall of the bush. The fat is scraped off the inside of the skin through the radial and axial displacement of the rib of the rotary screw spindle. At the ends of the bush and the screw spindle facing away from the bird the fat scraped off and collected in the grooves of the screw spindle is extracted through a pipe placed under partial vacuum.

A disadvantage of this known device lies in the fact that the screw spindle at the beginning of the fat removal operation generally finds few gripping points on the skin around the opening between the legs of the bird. This opening has an arbitrary contour, and a first gripping point on the skin will therefore generally be found along only a part of said contour, following which the remaining part of the skin is conveyed gradually towards and into the bush by the rotary screw spindle. There is a real risk here that no gripping point at all will be found and that the fat removal will fail, or that the skin will end up folded between the screw spindle and the bush, as a result of which pieces of skin can tear off and remain behind in the extracted fat and have to be removed from it, or that only a part of the extractable fat is scraped away from the skin, as a result of which the device is inefficient.

Another disadvantage lies in the rotary movement which is carried out by the screw spindle. The friction forces occurring between the skin and the screw spindle, in this case the outer periphery of the screw spindle rib, can result in the skin being carried along in the tangential direction by the screw spindle and tearing off around the opening in the bird. Such a torn-off piece of skin can no longer be moved in the axial direction into the bush and makes the device unsuitable for further fat removal. This fault will generally not be recognized immediately in an automatic machine comprising the fat removal device, the result of which is that a considerable number of birds remains unprocessed, and the quantity of fat extracted remains far below expectations. Moreover, due to the further automated processing of the bird, for example into bird parts, it will no longer be possible for the birds in which the fat removal has not taken place to be processed again in the fat removal device.

SUMMARY OF THE INVENTION

It is now the object of the invention to eliminate the afore-mentioned disadvantages and to provide a device which removes the abdominal fat from a slaughtered bird with great certainty, without the skin under which said fat is situated being damaged or torn off.

This object is attained according to the invention by a device comprising an elongated hollow mandrel, of which at least a part of the interior space can be connected to a vacuum source, which mandrel at the end facing the bird is provided with a suction aperture for sucking the skin with the adhering abdominal fat into the mandrel, at a distance from which the scraper element is fitted, said element being provided along its radial periphery with a scraping edge for interacting with the complementary-shaped edge of a supporting element, for the purpose of scraping away the abdominal fat along the scraping edge of the scraper element during a movement of the scraper element interacting with the supporting element away from the bird.

The invention also provides an installation which comprises a number of such devices, and a method for operating the device with two preferred embodiments.

In the device according to the invention the skin with the abdominal fat can be sucked by the vacuum source into the suction aperture between the open end of the mandrel and the scraper element, and into the hollow mandrel. A suitable selection of the suction force makes it possible to suck the skin with the abdominal fat past the scraping edge of the scraper element into the hollow mandrel. The supporting element, and in particular the edge thereof, can then be moved towards the scraping edge, a narrow gap remaining between the two edges. This gap, which is the width of the thickness of the skin of the bird, is maintained during a movement of the scraper element interacting with the supporting element away from the bird. The skin sucked into the mandrel here is withdrawn through the gap, and the scraping edge of the scraper element scrapes the abdominal fat from the inside of the skin.

It is advantageous to provide the scraping edge of the scraper element with an oval shape, since this shape best matches the contour of the opening between the legs of the bird, as a result of which the skin with the abdominal fat can spread as well as possible around the scraping edge and the scraping action is as effective as possible. The shape of the cross-section of the belly cavity can also best be approximated with the oval shape.

The scraping edge preferably forms part of an essentially conical guide head, the tip of the guide head facing away from the mandrel. The insertion of the scraper element into the bird is facilitated through this design, while the edge of the base of the cone acts as a scraping edge.

In a preferred embodiment of the device according to the invention, the scraper element is fixed to the mandrel by means of at least one strip. Said strip can be situated, for example, on the peripheral part of the scraping edge which moves in the belly cavity of the bird along the kidneys or other entrails. The strip then provides a simple and efficient safeguard against the kidneys or other entrails being undesirably sucked up by the mandrel from the belly cavity of the bird. If, on the other hand, the latter is desired, the strip or another fixing means must, of course, preferably not be fitted in the region of the kidneys or other entrails.

The mandrel is preferably provided with one or more channels of which one end is open and opens out at the suction aperture of the mandrel, while the other end is also open and is connected to the environmental atmosphere. The channels maintain an air flow in the mandrel even when the suction aperture of the mandrel is shut off, with the result that the skin with the abdominal fat is sucked into the desired position in the mandrel prior to the scraping off.

It is advantageous if the supporting element shuts off the suction aperture of the mandrel at least partially during the scraping off of the abdominal fat. This leads to an increase in the suction force of the device during the discharge of the scraped-off fat if this is obtained with the aid of vacuum.

An advantageous embodiment is obtained if the supporting element can be pressed in the direction of the scraping edge by means of spring means. With the aid of the spring means it is possible to set the force exerted by the scraping edge on the inside of the skin and occurring during the scraping off of the fat, so that a scraping action which can be accurately determined in advance is obtained.

It is advantageous to combine a number of devices according to the invention in an installation which is set up along a conveyor in which birds hanging by the legs on hooks are moved along, which installation comprises a fixed, essentially cylindrical drum, in the surface of which curved tracks are provided for controlling, by means of follow-on wheels guided in the curved tracks, the movement of the mandrel with the scraper element and the supporting element of the devices rotating around the drum, the peripheral speed of the devices being equal to the conveyance speed of the conveyor. Such an installation is simple to incorporate in a mechanised slaughter line.

In the case of the method already indicated above for operating the device, in an advantageous manner the fat gained can be sucked off by vacuum during and after scraping off. In another preferred embodiment of the method the fat collected along the scraping edge during scraping off is removed by mechanical means, for example by knocking against the scraper element or setting it into vibration, so that the fat falls off.

The claims and advantages will be more readily appreciated as the same becomes better understood by reference to the following detailed description and considered in connection with the accompanying drawings in which like reference symbols designate like parts.

BRIEF DESCRIPTION OF THE FIGURES

FIG. 1b shows a bottom view of the device according to FIG. 1a;

FIG. 1c shows a partial cross-section of another side of the embodiment shown in FIG. 1a;

FIGS. 2a-2f illustrate different successive processing stages of the extraction of abdominal fat from a bird by means of the device according to FIG 1c; and FIG. 3 shows a partial cross-section of a part of the installation according to the invention.

DESCRIPTION OF THE PREFERRED EMBODIMENTS

Figure 1A:
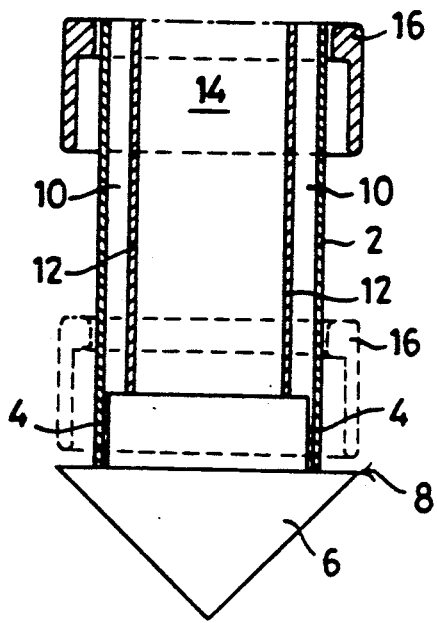
FIG. 1a shows a partial cross-section of one side of a schematically shown part of a preferred embodiment of the device according to the invention.
Figure 1C:
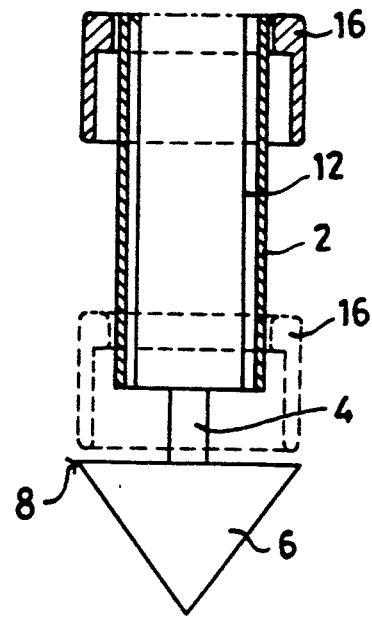
Figure 1B:
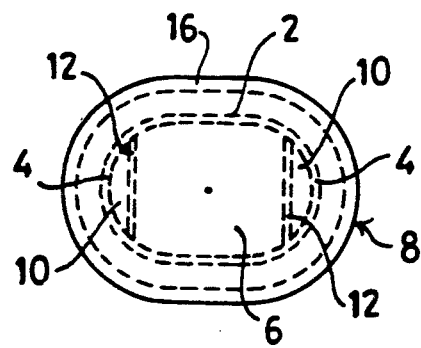

FIGS 1a-1c show a hollow mandrel 2 with an oval cross-section, to which an oval conical guide head 6, forming a scraper element, is fixed by means of two strips 4. The guide head 6 has an oval scraping edge 8 which is rounded. Two channels 10 are formed opposite each other in the mandrel 2 by placing strips 12 against the inside wall of the mandrel 2. Situated between the mandrel 2 and the guide head 6 is a gap through which air can be sucked to a space 14 bounded by the walls of the mandrel 2 and the strips 12, by connecting said space 14 to a vacuum source. On the outside of the mandrel 2 a supporting element 16 can be moved in the axial direction from a rest position shown in FIGS. 1a and 1c to a scraping position indicated by dashed lines in these figures. The scraping position of the supporting element 16 is such that a gap with a width the thickness of the skin of the bird to be processed is left between the bottom edge of the supporting element 16 and the scraping edge 8 of the guide head 6. Both the mandrel 2 with the guide head 6 connected thereto and the supporting element 16 can be moved independently of each other in the axial direction by means of the drive devices to be described in greater detail below with reference to FIG. 3.

Figure 2C:
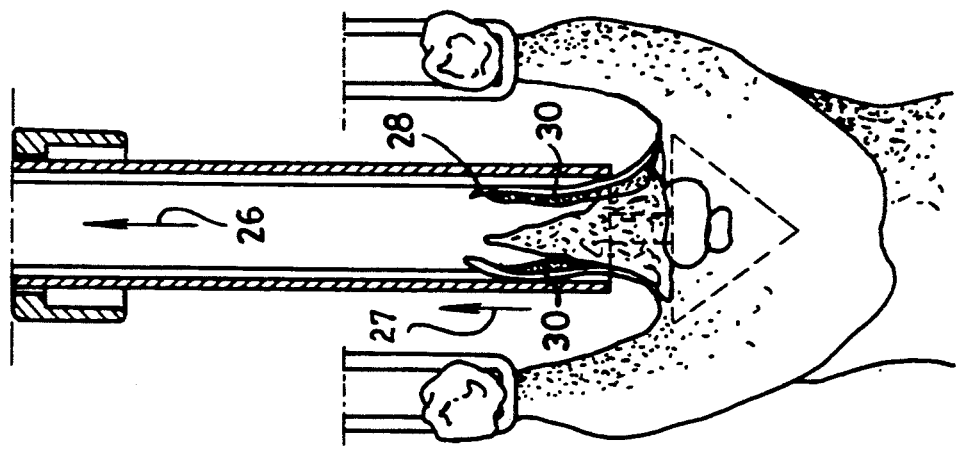
Figure 2B:
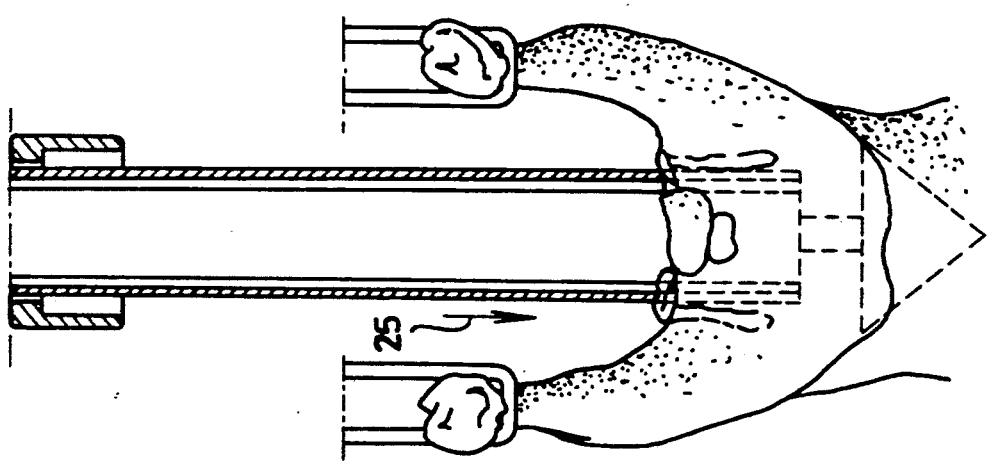
Figure 2A:
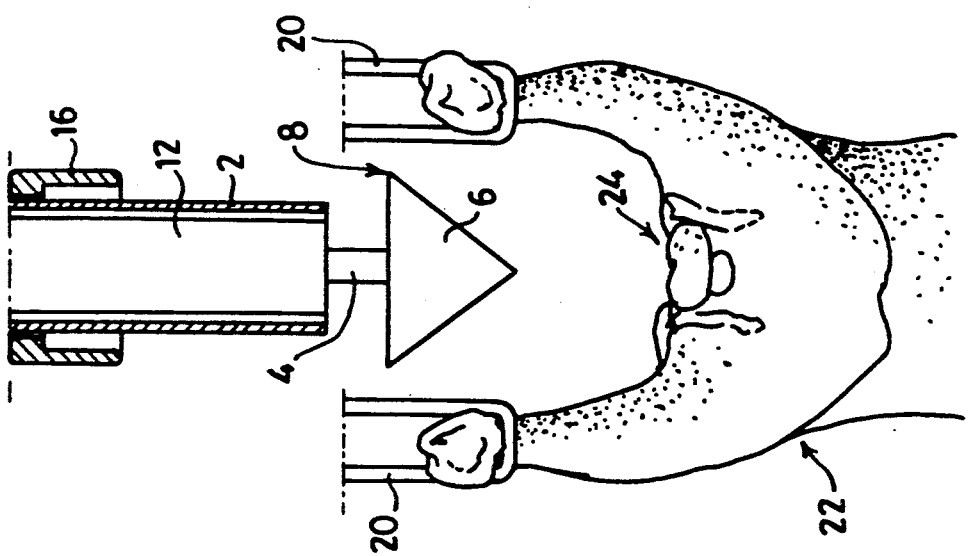
Figure 5:
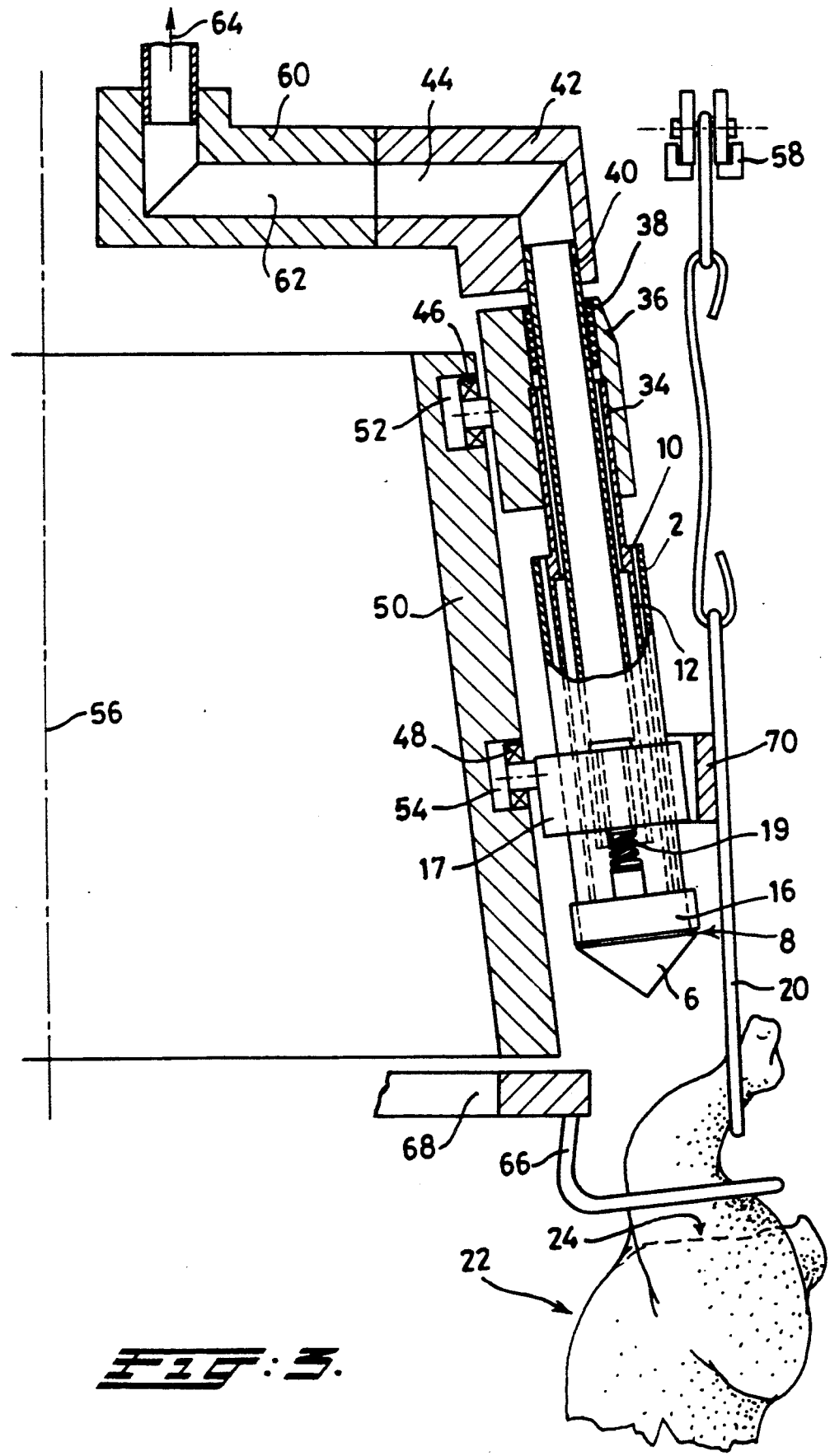

The operation of the device according to the invention for the removal of abdominal fat from a slaughtered bird works will be described in greater detail with reference to FIGS. 2a-2f. FIG. 2a shows the back side of a bird 22 suspended by the tarsal joints of the legs in hooks 20. Between the two legs of the bird 22 is an abdominal opening 24, which has been produced for removal of the entrails from the belly cavity of the bird. The skin on the inside of which the abdominal fat to be extracted is situated lies around said opening 24, hanging partially into the belly cavity. The device already described with reference to FIG. 1c is positioned above the opening 24.

The first stage of the operation, which is illustrated with reference to FIG. 2b, comprises inserting the guide head 6 and a part of the mandrel 2 into the belly cavity of the bird 22, the insertion being symbolised by the arrow 25. The air is then sucked out of the space 14 of the mandrel 2 by means of a vacuum source, e.g. a pump, which is symbolised by the arrow 26 in FIG. 2c. It can also be seen in this figure that the mandrel is withdrawn (symbolised by the arrow 27) so far out of the bird 22 relative to the position shown in FIG. 2b that the scraping edge 8 of the guide head 6 lies approximately at the level of the edge of the opening 24. Through the vacuum in the space 14 of the mandrel 2, the skin 28 with the abdominal fat 30 is sucked into the mandrel 2. It is ensured here that the channels formed by means of the strips 12 on either side of the space 14 in the mandrel 2 at the side facing away from the guide head 6 are connected to the environmental atmosphere, so that the air sucked off in the direction of the arrow 26 does not come only from the gap between the mandrel end and the guide head 6, but also comes from the above-mentioned channels.

As illustrated in FIG. 2d, the supporting element 16, which is slidable along the outside of the mandrel 2, is then moved downwards by moving a ring 17 in the direction of the guide head 6 along the mandrel 2. The ring 17 is coupled by schematically shown spring means 19 to the supporting element 16, as a result of which the bottom edge of the supporting element 16 presses the skin of the bird 22 against the scraping edge 8 of the guide head 6. The spring means 19 can be designed in such a way that the pressure exerted on the skin and the scraping edge 8 is accurately known.

FIG. 2e shows the next stage of the fat removal operation, in which the guide head 6 is moved away from the bird 22, while the supporting element 16 continues to exert pressure on the scraping edge 8 of the guide head 6. In this way the scraping edge 8 scrapes the abdominal fat 30 from the inside of the skin 28. The fat 30 collects here on the top side of the guide head 6. Although the suction aperture of the mandrel 2 is shut off in this stage of the operation by the supporting element 16 and the skin 28, an air flow is still present in the space 14 of the mandrel 2 in the direction of the arrow 26, thanks to the channels 10 inside the mandrel in communication with the environmental atmosphere. The fat 30 obtained is carried along in the air flow and can be collected at a suitable point and processed further.

When it has moved a predetermined distance from the opening 24 of the bird 22, the supporting element 16 is moved back to its rest position. The above-mentioned distance is selected in such a way that the fat 30 in this position is scraped completely from the skin 28. The skin from which the fat has been removed falls back around the opening 24 of the bird 22, which is shown in FIG. 2f. The bird can now be discharged for possible further processing operations, and the device is ready for the next operation.

It will be clear to the person skilled in the art that it is possible to set up a number of the fat removal devices shown in a carrousel arrangement along a conveyor in a slaughter line for birds, the mandrel and the supporting element of the fat removal devices being moveable, for example, with the aid of curved track controls.

Such an installation is described with reference to FIG. 3, in which only one fat removal device out of a larger number which the installation can comprise is shown.

FIG. 3 shows a bush 34 which is connected to the strips 12 and the mandrel 2, and which is fixed in a follow-on element 36 which is movable in the axial direction of the mandrel 2 along guides (not shown). The follow-on element 36 is slidable by means of a bearing bush 38 onto a coaxial tube 40 projecting deep into the mandrel 2, and being open at its end projecting into the mandrel. The other end of the tube 40 is also open and is fixed in a mounting 42 in which a channel 44 which connects to the interior space of the tube 40 is provided.

Both the follow-on element 36 and the ring 17 carry follow-on wheels 46 and 48, respectively, which can move in curve tracks 52 and 54, respectively, provided on the outer periphery of a stationary tapering drum 50. For this, the mounting 42, the follow-on element 36, the ring 17 and the elements connected thereto can be moved along the external surface of the drum 50 about a vertical axis 56 in such a way that they move in synchronism with a bird 22 hanging from hooks 20 in a conveyor 58 and moved about the axis 56. The curved tracks 52 and 54 run in such a way that the mandrel 2 and the ring 17 carry out the movements relative to the bird 22 shown in FIGS. 2a-2f. The vacuum desired here in the mandrel 2 during certain stages of the fat removal operation can be created by connecting the aperture of mounting 42, directed radially towards the axis 56, to a suction aperture of a channel 62, facing radially away from the axis 56, and fitted in a stationary suction part 60, which aperture extends in the tangential direction over a part of the path of the mounting 42 about the axis 56, and from which channel 62 the air can be extracted in the direction of arrow 64 by means of a vacuum source, for example a pump.

During the scraping of the skin, essentially upward directed forces are exerted on the skin around the opening 24 of the bird 22. In order to prevent these forces from lifting the bird 22 and the suspension in the hook 20 being lost, an essentially U-shaped bracket 66 which moves with the fat removal device on a ring 68 is provided above the position of the opening 24 of the bird 22, which bracket extends, viewed from the top side, around the boundaries of the opening 24 between the legs and supports the bird 22 in the upward direction during the scraping off of the fat.

The distance in the radial direction between the hook 20 and the mandrel 2 is set by means of a spacer ring 70 which is fitted concentrically with the axis 56.

While the invention has been described and illustrated in its preferred embodiments, it should be understood that departures may be made therefrom within the scope of the invention, which is not limited to the details disclosed herein.

What is claimed is:

1. A device for removing abdominal fat from a slaughtered bird, comprising a scraper element which is movable to and partially into the bird through an abdominal opening between the legs, and which has a scraping edge which is movable along the fat on the inside of the skin around the abdominal opening, and a discharge device for discharging the fat scraped off by the scraper element, the device further comprising an elongated hollow mandrel, of which at least a part of the interior space can be connected to a vacuum source, which mandrel at the end facing the bird is provided with a suction aperture for sucking the skin with the adhering abdominal fat into the mandrel, at a distance from which the scraper element is fitted, said scraper element being provided along its radial periphery with a scraping edge for interacting with the complementary-shaped edge of a supporting element, for the purpose of scraping the abdominal fat along the scraping edge of the scraper element during a movement of the scraper element interacting with the supporting element away from the bird.

2. A device according to claim 1, wherein the scraping edge of the scraper element is an oval shape.

3. A device according to claim 1, wherein the scraping edge forms part of an essentially conical guide head, the tip of the guide head facing away from the mandrel.

4. A device according to claim 1, wherein the scraper element is fixed to the mandrel by means of at least one strip.

5. A device according to claim 1, wherein the mandrel is provided with one or more channels of which one end is open and opens out at the suction aperture of the mandrel, while the other end is also open and is connected to the environmental atmosphere.

6. A device according to claim 1, wherein the supporting element shuts off the suction aperture of the mandrel at least partially during the scraping off of the abdominal fat.

7. A device according to claim 1, wherein the supporting element can be pressed in the direction of the scraping edge by means of spring means.

8. An installation for removing abdominal fat from slaughtered birds, comprising a number of devices for removing abdominal fat from a slaughtered bird, each of said devices comprising a scraper element which is movable to and partially into the bird through a abdominal opening between the legs, and which has a scraping edge which is movable along the fat on the inside of the skin around the abdominal opening, and a discharge device for discharging the fat scraped off by the scraper element, the device further comprising an elongated hollow mandrel, of which at least a part of the interior space can be connected to a vacuum source, which mandrel at the end facing the bird is provided with a suction aperture for sucking the skin with the adhering abdominal fat into the mandrel, at a distance from which the scraper element is fitted, said scraper element being provided along its radial periphery with a scraping edge for interacting with the complementary-shaped edge of a supporting element, for the purpose of scraping the abdominal fat along the scraping edge of the scraper element during a movement of the scraper element interacting with the supporting element away from the bird; the installation being set up along a conveyor in which birds hanging by the legs on hooks are moved along, which installation comprises a fixed, essentially cylindrical drum, in the surface of which curved tracks are provided for controlling, by means of follow-on wheels guided in the curved tracks, the movement of the mandrel with the scraper element and the supporting element of the devices rotating around the drum, the peripheral speed of the devices being equal to the conveyance speed of the conveyor.

9. A method for operating a device for removing abdominal fat from a slaughtered bird, said device comprising a scraper element which is movable and partially into the bird through an abdominal opening between the legs, and which has a scraping edge which is movable along the fat on the inside of the skin around the abdominal opening, and a discharge device for discharging the fat scraped off by the scraper element, the device further comprising an elongated hollow mandrel, of which at least a part of the interior space can be connected to a vacuum source, which mandrel at the end facing the bird is provided with a suction aperture for sucking the skin with the adhering abdominal fat into the mandrel, at a distance from which the scraper element is fitted, said scraper element being provided along its radial periphery with a scraping edge for interacting with the complementary-shaped edge of a supporting element, for the purpose of scraping the abdominal fat along the scraping edge of the scraper element during a movement of the scraper element interacting with the supporting element away from the bird; said method comprising the steps of:
- inserting the scraper element into the belly cavity of the bird through an abdominal opening between the legs of the bird;
- sucking the skin on the inside of which the abdominal fat is situated through the suction aperture of the mandrel into the mandrel;
- moving the supporting element to the scraping edge, leaving a narrow gap between the edge of the supporting element and the scraping edge; and
- moving the scraper element and the supporting element interacting therewith away from the bird for scraping the abdominal fat from the skin.

10. A method according to claim 9, wherein the fat is sucked off by vacuum during and after the scraping off.

11. A method according to claim 9, wherein the fat which has collected along the scraping edge during the scraping is removed after the scraping, using mechanical means.

* * * * *